United States Patent Office 2,946,814
Patented July 26, 1960

2,946,814
PROCESS FOR THE PREPARATION OF ARSENIC XANTHATES AND PARASITICIDAL COMPOSITIONS PRODUCED THEREBY

Cesare Augusto Peri, Milan, Italy, assignor to Montecatini, Società Generale per l'Industria Mineraria e Chimica, a corporation of Italy No Drawing. Filed July 10, 1956, Ser. No. 596,826

Claims priority, application Italy July 13, 1955

7 Claims. (Cl. 260—440)

The present invention relates to the preparation and use of mono- or di-alkyl (aryl)-arsenic alkyl xanthates of the general formula

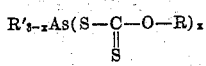

wherein R is a member of the group consisting of saturated and unsaturated linear and branched alkyls and cycloparaffins; R' is a member of the group consisting of alkyls and aryls and substituted alkyls and aryls; and x is a denominator representing the numerals 1 and 2.

These new arsenic xanthates are liquid or crystalline materials, soluble in most organic solvents and insoluble in water.

The products of the present invention have been found useful as parasiticides and in parasiticidal mixtures because of their activity as insecticides, fungicides and weed killers.

It is therefore the primary object of the present invention to furnish these new mono- or di-alkyl-arsenic alkyl xanthates.

It is another object of the invention to use these new mono- or di-alkyl-arsenic alkyl xanthates and/or preparations thereof as insecticides, fungicides and weed killers.

It is a still further object of the invention to furnish methods of preparing these new mono- or di-alkyl-arsenic alkyl xanthates.

These and other objects and advantages of this invention will appear more clearly from the herein-following detailed description and the appended claims.

These mono- or di-alkyl-arsenic alkyl xanthates are prepared by reacting, at a temperature ranging from 0° C. to refluxing temperature, aliphatic or aromatic haloarsines with alkali metal xanthates, either in suspension or solution in a solvent which preferably does not exert an action on the haloarsine. The principle of the reaction is illustrated by the following reaction scheme:

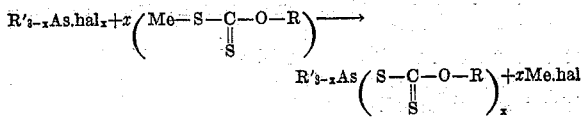

Me in the reaction scheme is an alkali or alkali-earth metal; x in the reaction scheme is 1 or 2.

The reaction products are readily recovered, for example by adding water or by evaporation of the solvent, if necessary after removal of the metal halide.

The following examples are presented to illustrate, but not to limit the present invention:

EXAMPLE 1.—DIMETHYLARSENIC ETHYLXANTHATE

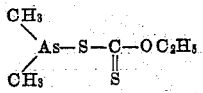

42 g. chlorodimethylarsine are dissolved in 50 cc. acetone and added, while stirring, to 57 g. potassium ethylxanthate suspended in 300 cc. acetone of 25–30° C. The mixture is refluxed for 5 minutes. Addition of water, after cooling, causes the separation of an oil which can be purified by distillation in vacuum. The product obtained has a B.P. of 137–138° C. at 18 mm. Hg.

EXAMPLE 2.—DIMETHYLARSENIC ISOPROPYLXANTHATE

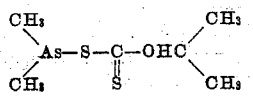

56 g. chlorodimethylarsine in 50 cc. absolute alcohol are added, while stirring, to 70 g. sodium isopropylxanthate in 150 cc. absolute alcohol of 15–20° C. After stirring the mixture in the cold for 2 hours, 250 cc. water are added. The oil separating thereby can be purified by distillation in vacuum. It has a B.P. of 106–108° C. at 3 mm./Hg; M.P. is 38–29° C.

EXAMPLE 3.—DIMETHYLARSENIC n-AMYLXANTHATE

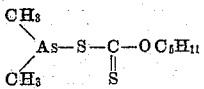

28 g. chlorodimethylarsine in 25 cc. absolute ethyl alcohol are added, while stirring, to 50 g. potassium amylxanthate alcohol of 25–30° C. The mixture is stirred for 2 hours and then poured into water. The oil separated in this manner is distilled. It has a B.P. of 104° C. at 0.2 mm./Hg.

EXAMPLE 4.—DIMETHYLARSENIC ALLYLXANTHATE

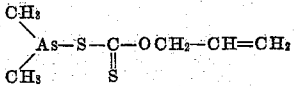

23 g. metallic sodium are added to 230 g. allyl alcohol and the mixture is heated while stirring until the sodium is completely dissolved. 80 g. carbon disulphide are then added at 20° C. Excess allyl alcohol is removed by heating under vacuum at no more than 70° C. After adding 200 cc. absolute allyl alcohol to the residue and cooling to 10° C., 140 g. chlorodimethylarsine are added to the residue. The mixture is stirred for 2 more hours and poured into water. The oil, separated in this manner, is purified by distillation under vacuum. The product has a B.P. of 90–95° C. at 1.5 mm./Hg.

EXAMPLE 5.—DIMETHYLARSENIC LAURYLXANTHATE

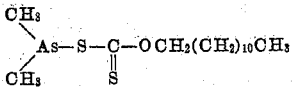

28 g. chlorodimethylarsine in 50 cc. absolute ethyl alcohol are added, while stirring, to a solution of 68 g. sodium laurylxanthate in 200 cc. absolute alcohol adjusted to 15–20° C. Stirring in the cold is continued for 2 hours. Precipitated sodium chloride is filtered off and the filtrate is concentrated. The residual yellow oil can be purified by distillation under vacuum. The product has a B.P. of 199–201° C. at 2 mm./Hg; M.P. about 0° C.

EXAMPLE 6.—DIMETHYLARSENIC CYCLOHEXYLXANTHATE

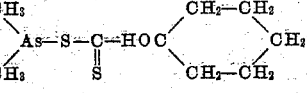

39 g. chlorodimethylarsine in 50 cc. absolute ethyl alcohol are added, while stirring, to a solution of 58 g. sodium cyclohexylxanthate in 350 cc. absolute ethyl alcohol kept at 15–20° C. The mixture is agitated in the cold for 2 hours and is then poured into water; an oil separates which can be purified by distillation under vacuum. The product has a B.P. of 153–154° C. at 2.5 mm./Hg.

EXAMPLE 7.—PHENYLARSENIC BIS(ETHYLXANTHATE)

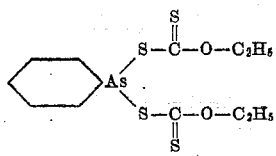

44 g. phenyldichloroarsine dissolved in 150 cc. absolute alcohol are added dropwise while stirring to a suspension of 64 g. potassium ethylxanthate in 50 cc. absolute alcohol kept at a temperature of 20–30° C. After refluxing for a few minutes, the mixture is drowned in water and the separated oil is thoroughly washed to neutral reaction. A brown, viscous oil is obtained which cannot be purified by distillation.

EXAMPLE 8.—PHENYLARSENIC BIS(ISOPROPYLXANTHATE)

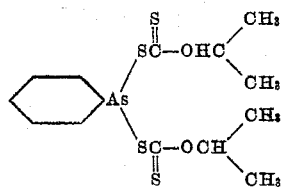

44 g. phenyldichloroarsine dissolved in 100 cc. absolute alcohol are added, while stirring, to a suspension of 70 g. sodium isopropylxanthate in 150 cc. absolute alcohol kept at a temperature between 20 and 30° C. The mixture is refluxed for a few minutes, drowned in water and the crystalline substance which separates is filtered. The product obtained has a M.P. of 106–107° C.

EXAMPLE 9.—PHENYLARSENIC BIS(AMYLXANTHATE)

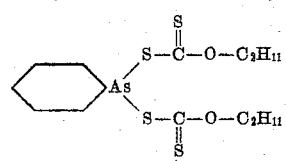

44 g. phenyldichloroarsine dissolved in 100 cc. absolute alcohol are added, while stirring, to a suspension of 80 g. potassium amylxanthate in 150 cc. absolute alcohol, kept at a temperature of 20 to 30° C. After refluxing for a few minutes, the mixture is drowned in water and the oil separating thereby is thoroughly washed. The product obtained is a yellow oil which cannot be purified by distillation.

EXAMPLE 10.—PARA-CHLOROPHENYLARSENIC BIS(ETHYLXANTHATE)

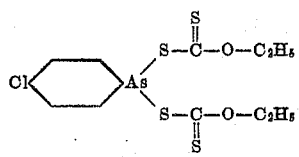

25.7 g. p.chlorophenyldichloroarsine dissolved in 75 cc. absolute alcohol are added, while stirring, to a suspension of 35 g. potassium ethylxanthate in 250 cc. absolute alcohol, kept at 20–30° C. The mixture is stirred in the cold for 2 hours, then drowned in water and the oil separating thereby is washed. The product obtained is a yellow oil that cannot be distilled.

EXAMPLE 11.—p-NITROPHENYLARSENIC BIS(ETHYLXANTHATE)

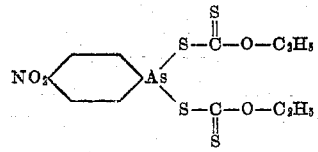

27 g. p.nitrophenyldichloroarsine dissolved in 75 cc. of absolute alcohol are added, while stirring, to a suspension of 35 g. potassium ethylxanthate in 250 cc. of absolute alcohol, kept at 20–30° C. The mixture is stirred in the cold for 2 hours, then drowned in water and the crystalline product that separates is filtered. The product obtained has a M.P. of 78–79° C.

EXAMPLE 12.—DIPHENYLARSENIC ETHYLXANTHATE

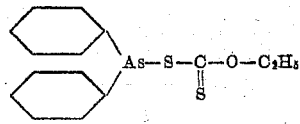

52 g. diphenylchloroarsine dissolved in 200 cc. absolute alcohol are added, while stirring, to a suspension of 32 g. potassium ethylxanthate in 250 cc. absolute ethyl alcohol kept at 20–25° C. After refluxing for 5 minutes, the mixture is drowned in water, whereby a yellow oil is obtained which cannot be purified by distillation.

EXAMPLE 13.—DIPHENYLARSENIC ISOPROPYLXANTHATE

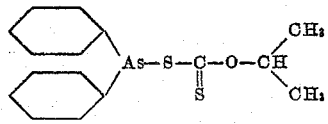

52 g. diphenylchloroarsine in 200 cc. absolute alcohol are added, while stirring, to a suspension of 35 g. potassium isopropylxanthate in 100 cc. absolute alcohol, kept at 20–25° C. After refluxing for 5 minutes, the mixture is drowned in water, whereby an oil is obtained which cannot be purified by distillation.

*Results of an evaluation of the biological activity of the products described in the foregoing examples.*—The products included in the general formula herein set forth possess decided parasiticidal properties which make them suitable for a practical use.

The following examples are presented to illustrate these parasiticidal properties.

*Insecticidal activity on Musca domestica.*—By topical application, by means of microsyringe, of acetone solutions of the products under examination to five days old flies, the following average percent mortalities were obtained after 20 hours.

By tarsal absorption, when introducing five days old female flies into beakers previously treated with controlled amounts of benzene solutions of the active substances under examination, and leaving the flies in contact with these substances for 20 hours, the following mortalities were observed.

| | Percent mortality after 20 hours | | | | | |
|---|---|---|---|---|---|---|
| | topical application, γ/fly | | | | tarsal absorption, g./m.³ | |
| | 50 | 10 | 2 | 0.4 | 0.125 | 0.250 |
| Dimethylarsenic ethylxanthate | | 93 | 5 | 3 | | 55 |
| Dimethylarsenic n-amylxanthate | 100 | 25 | 0 | 0 | 97 | 100 |
| Phenylarsenic bis (isopropylxanthate) | | 1 | | | | |
| Phenylarsenic bis (amylxanthate) | 65 | 12 | 0 | 0 | | |
| p-Nitrophenylarsenic bis (ethylxanthate) | | 8 | 0 | | | |
| Diphenylarsenic ethylxanthate | | | | | 84 | |
| Diphenylarsenic isopropylxanthate | 100 | 87 | 6 | 0 | | |

*Aphis fabae.*—By spraying a population of aphides, apterous virginoparous females, on bean plants under standardized conditions with a suitably formulated aqueous dispersion of the compounds under examination, the average mortalities indicated hereunder were obtained after 24 hours.

*Tetranychus telarius.*—By spraying a mixed population of mites in various stages of growth on bean plants under standardized conditions with a suitably formulated aqueous dispersion of the compounds under examination, the average mortalities hereunder indicated were obtained after 24 hours:

|  | Activity expressed as percent mortality after 24 hours at the doses indicated, on— | | | | |
|---|---|---|---|---|---|
|  | *Aphis fabae* | | *Tetranychus telarius* | | |
| conc. percent A.S. | 0.5 | 0.1 | 0.5 | 0.1 | 0.02 |
| Dimethylarsenic ethylxanthate | 100 | 0 | 100 | 10 | 0 |
| Dimethylarsenic isopropylxanthate | 40 | 15 | 95 | 0 | ----- |
| Dimethylarsenic n-amylxanthate | 85 | 15 | 100 | 99 | 0 |
| Dimethylarsenic laurylxanthate | ----- | 20 | ----- | 90 | 0 |
| Phenylarsenic bis (ethylxanthate) | 45 | 3 | 95 | 50 | 15 |
| Diphenylarsenic ethylxanthate | 92 | 25 | 100 | 94 | 2 |
| Diphenylarsenic isopropylxanthate | 50 | 15 | 100 | 90 | 10 |

Spraying of mite eggs gave the following average mortalities (control 5 days after treatment):

|  | Activity on eggs of *T. telarius*, mortality after 5 days at the concentrations of A.S. indicated | | |
|---|---|---|---|
|  | 0.05 | 0.25 | 0.1 |
| Dimethylarsenic ethylxanthate | 60 | 2 | 0 |
| Dimethylarsenic isopropylxanthate | 100 | 0 | ----- |
| Dimethylarsenic n-amylxanthate | 100 | 20 | 0 |
| Dimethylarsenic laurylxanthate | 100 | 0 | 0 |
| Phenylarsenic bis(ethylxanthate) | 98 | 70 | 25 |
| p-Nitrophenylarsenic bis(ethylxanthate) | 0 | 0 | 0 |
| Diphenylarsenic ethylxanthate | 0 | 0 | 0 |

The fungicidal activity of the herein claimed products is illustrated by the following results obtained upon laboratory evaluations carried out by means of standard procedures.

(1) *Evaluation of the capability of the products to inhibit growth and diffusion of fungus mycelium (1).*—The technique employed consists in pouring into previously sterilized Petri dishes (10 cm. in diameter) 10 cc. of nutrient agar inoculated with a suspension of spores and mycelium of the test fungi. After the agar surface has solidified, three small porcelain dishes, each containing 0.025 cc. of a solution of known strength of the product to be tested, are placed on the surface of each Petri plate and the plates are incubated in a thermostat at 24° C. for 72 hours. At the end of this period, the distance between the outer rim of the porcelain dishes and the border line to which the test fungus grows is measured.

The results of the evaluation made by this technique on the products claimed herein, as indicated in Table A, are expressed in millimeters. When no fungus colony grows on the agar-treated surface of the plate, the result is expressed by the term "total inhibition."

(2) *Evaluation of the capability of the products to inhibit growth diffusion of fungus mycelium, after absorption on filter paper, evaporation of the solvent, resolubilization, and diffusion in nutrient agar (1-2-3-4-5).*—This technique includes moistening small sterile disks of filter paper (10 mm. in diameter) with 0.05 cc. of a solution of known strength of the compound to be assayed. After drying, the disks are placed onto the agar-treated surface of Petri dishes (10 cm. in diameter), prepared as previously indicated. Three of these disks are placed into each Petri dish. After incubation in a thermostat at 24° C. for 72 hours, the distance between the rim of the disk and the border line to which the test fungus grows is measured on the agar-treated surface and expressed in mm. (Table B). When no fungus colony grows on the surface of the plate, the result is expressed with the term "total inhibition."

(3) *Evaluation of the capability to inhibit germination of spores and growth of fungus mycelium, of compounds incorporated in nutrient agar (5-6-7).*—This technique indicates the fungicidal activity of compounds scarcely diffusible in agar. It consists in pouring into Petri dishes of 10 cm. diameter, 9 cc. of nutrient agar mixed with 1 cc. of a solution of known strength of the compound to be assayed. After the surface has solidified, spores and mycelium of test fungi are spread in streaks and the dose of material under examination at which no growth of fungus colonies is noted after 72 hours of incubation in a thermostat at 24° C. is determined and expressed in percent of active substance (Table C).

(4) *Evaluation of the capability of the products to inhibit germination of spores of fungi (8).*—Drops of suspensions consisting of spores of *Alternaria tenuis* in solutions of known strength of the products to be assayed are pipetted on microscope slides provided with annular grooves which delimit the retaining areas of the drops on the surface of the slide. These slides, each with 4 drops, are placed into Petri dishes of 18 cm. diameter which are converted into moist chambers by means of a filter paper disk, soaked with water, and placed on the bottom of each dish. After the dishes are incubated in a thermostat at 20° C. for 18 hours, the slides are observed under a microscope and the percentages of ungerminated spores are determined (Table D).

TABLE A

|  | Percent conc. used in tests | Halo of inhibition in mm. on — | | | |
|---|---|---|---|---|---|
|  |  | *Alternaria tenuis* Nees | *Aspergillus niger* Tiegh | *Penicillium roqueforti* Thom | *Saccar. ellip.* Hansen |
| Dimethylarsenic ethylxanthate. | 1 | total | total | total | total |
|  | 0.1 | 20 | 18 | 21 | 18 |
|  | 0.1 | 4 | 2 | 6 | 5 |
| Dimethylarsenic isopropylxanthate. | 1 | total | total | total | total |
|  | 0.2 | 25 | 24 | total | total |
| Dimethylarsenic n-amylxanthate. | 1 | total | total | total | total |
|  | 0.1 | 8 | 1 | 1 | 8 |
| Dimethylarsenic allylxanthate. | 1 | total | total | total | total |
|  | 0.2 | 12 | 4 | 9 | 12 |
| Dimethylarsenic laurylxanthate. | 1 | total | 28 | 30 | 20 |
|  | 0.1 | 18 | 20 | 18 | 6 |
|  | 0.01 | 2 | 2 | 3 | 2 |
| Dimethylarsenic cyclohexylxanthate. | 1 | total | total | total | total |
|  | 0.2 | 20 | 30 | 18 | 14 |
|  | 0.04 | 6 | 5 | 9 | 8 |
| Phenylarsenic bis (ethylxanthate). | 2 | total | 30 | total | 15 |
|  | 0.4 | total | 21 | 23 | 11 |
|  | 0.08 | total | 15 | 12 | 9 |
| Phenylarsenic bis (isopropylxanthate). | 2 | 27 | 16 | 12 | 6 |
|  | 0.4 | 27 | 16 | 11 | 3 |
|  | 0.08 | 26 | 16 | 9 | 3 |
| Diphenylarsenic bis (amylxanthate). | 2 | total | 27 | 24 | 14 |
|  | 0.4 | 30 | 20 | 17 | 5 |
|  | 0.08 | 30 | 10 | 7 | 1 |
| p.Chlorophenylarsenic bis (ethylxanthate). | 2 | total | 29 | 28 | 17 |
|  | 0.4 | total | 27 | 25 | 12 |
|  | 0.08 | total | 20 | 23 | 9 |
| p.Nitrophenylarsenic bis (ethylxanthate). | 2 | total | 28 | total | 22 |
|  | 0.4 | total | 24 | total | 19 |
|  | 0.08 | 30 | 10 | 18 | 11 |
| Diphenylarsenic ethylxanthate. | 2 | 20 | 21 | 18 | 9 |
|  | 0.4 | 12 | 11 | 12 | 6 |
|  | 0.08 | 2 | 2 | 2 | 2 |
| Diphenylarsenic isopropylxanthate. | 2 | 22 | 22 | 19 | 8 |
|  | 0.4 | 21 | 19 | 17 | 7 |
|  | 0.08 | 19 | 16 | 14 | 5 |
| Zinc ethylenebisdithiocarbamate. | 0.4 | 4 | 7 | 12 | 5 |
|  | 0.08 | 2 | 2 | 6 | 3 |
| Sodium pentachlorophenate, technical grade. | 5 | total | 26 | 28 | 21 |
|  | 1 | 28 | 22 | 24 | 13 |
|  | 0.2 | 21 | 12 | 12 | 7 |

TABLE B

| | Percent conc. used in tests | Halo of inhibition in mm. on — | | | |
|---|---|---|---|---|---|
| | | Alternaria tenuis Nees | Aspergillus niger Tiegh | Penicillium roqueforti Thom | Saccar. ellip. Hansen |
| Dimethylarsenic ethylxanthate | 1 | total | total | total | total |
| | 0.1 | 14 | 6 | 12 | 13 |
| | 0.01 | 2 | 0 | 3 | 3 |
| Dimethylarsenic isopropylxanthate | 1 | total | total | total | total |
| | 0.2 | 20 | 17 | total | total |
| Dimethylarsenic n-amylxanthate | 1 | total | total | total | total |
| | 0.1 | 4 | 4 | 8 | 3 |
| Dimethylarsenic allylxanthate | 1 | total | total | total | total |
| | 0.2 | 9 | 2 | 5 | 8 |
| Dimethylarsenic laurylxanthate | 1 | total | 17 | 22 | 20 |
| | 0.1 | 16 | 17 | 15 | 10 |
| | 0.01 | 3 | 2 | 3 | 2 |
| Dimethylarsenic cyclohexylxanthate | 1 | total | total | total | total |
| | 0.2 | 17 | 31 | 17 | 16 |
| | 0.04 | 6 | 0 | 6 | 1 |
| Phenylarsenic bis (ethylxanthate) | 2 | total | 23 | total | 13 |
| | 0.4 | total | 18 | 22 | 11 |
| | 0.08 | 32 | 17 | 16 | 8 |
| Phenylarsenic bis (isopropylxanthate) | 2 | 25 | 18 | 11 | 3 |
| | 0.4 | 24 | 15 | 9 | 2 |
| | 0.08 | 24 | 12 | 5 | 1 |
| Phenylarsenic bis (amylxanthate) | 2 | total | 20 | 21 | 12 |
| | 0.4 | 30 | 15 | 11 | 2 |
| | 0.08 | 26 | 17 | 13 | 2 |
| p-Chlorophenylarsenic bis (ethylxanthate) | 2 | total | 28 | 29 | 15 |
| | 0.4 | total | 26 | 26 | 12 |
| | 0.08 | 32 | 23 | 25 | 9 |
| p-Nitrophenylarsenic bis (ethylxanthate) | 2 | total | 22 | total | 12 |
| | 0.4 | total | 25 | total | 11 |
| | 0.08 | 27 | 12 | 17 | 7 |
| Diphenylarsenic ethylxanthate | 2 | 18 | 16 | 18 | 8 |
| | 0.4 | 12 | 13 | 16 | 5 |
| | 0.08 | 0 | 0 | 0 | 2 |
| Diphenylarsenic isopropylxanthate | 2 | 15 | 15 | 15 | 5 |
| | 0.4 | 13 | 14 | 15 | 4 |
| | 0.08 | 12 | 14 | 13 | 4 |
| Zinc ethylenebisdithiocarbamate | 0.4 | 2 | 4 | 8 | 2 |
| | 0.08 | 0 | 0 | 3 | 0 |
| Sodium pentachlorophenate, technical grade | 5 | total | 23 | 25 | 15 |
| | 1 | 25 | 19 | 20 | 10 |
| | 0.2 | 18 | 14 | 10 | 6 |

TABLE C

| | Inhibition dose for test fungi | | | |
|---|---|---|---|---|
| | Alternaria tenuis Nees | Aspergillus niger V. Tiegh | Penicillium roqueforti Thom | Saccaromyces ellipsoideus Hansen |
| Dimethylarsenic ethylxanthate | 0.001 | 0.001 | 0.001 | 0.001 |
| Dimethylarsenic isopropylxanthate | 0.02 | 0.02 | 0.02 | 0.02 |
| Dimethylarsenic n-amylxanthate | 0.01 | 0.01 | 0.01 | 0.01 |
| Dimethylarsenic allylxanthate | 0.004 | 0.004 | 0.004 | 0.004 |
| Dimethylarsenic laurylxanthate | 0.01 | 0.01 | 0.01 | 0.01 |
| Dimethylarsenic cyclohexylxanthate | 0.02 | 0.02 | 0.004 | 0.004 |
| Phenylarsenic bis (ethylxanthate) | 0.0016 | 0.0016 | 0.0016 | 0.0016 |
| Phenylarsenic bis (isopropylxanthate) | 0.0016 | 0.0016 | 0.0016 | 0.0016 |
| Phenylarsenic bis (amylxanthate) | 0.0016 | 0.0016 | 0.0016 | 0.008 |
| p-Chlorophenylarsenic bis (ethylxanthate) | 0.0016 | 0.0016 | 0.0016 | 0.0016 |
| p-Nitrophenylarsenic bis (ethylxanthate) | 0.0016 | 0.0016 | 0.0016 | 0.0016 |
| Diphenylarsenic ethylxanthate | 0.008 | 0.008 | 0.008 | 0.008 |
| Diphenylarsenic isopropylxanthate | 0.0016 | 0.0016 | 0.008 | 0.008 |
| Zinc ethylenebisdithiocarbamate | 0.02 | 0.02 | 0.02 | 0.02 |
| Sodium pentachlorophenate, technical grade | 0.004 | 0.004 | 0.004 | 0.02 |

TABLE D

Inhibition dose for the germination of spores of *Alternaria tenuis* Nees in p.p.m.:

| | |
|---|---|
| Phenylarsenic bis(ethylxanthate) | 6 |
| Phenylarsenic bis(isopropylxanthanate) | 10 |
| Phenylarsenic bis(amylxanthate) | 1 |
| p-Chlorophenylarsenic bis(ethylxanthate) | 3 |
| p-Nitrophenylarsenic bis(ethylxanthate) | 1 |
| Diphenylarsenic ethylxanthate | 1 |
| Diphenylarsenic isopropylxanthate | 3 |
| Zinc ethylenebisdithiocarbamate | 175 |
| Sodium pentachlorophenate, technical grade | 100 |

We claim:

1. In the art of control of insect and fungus pests, the improvement comprising applying to the locality of the said pests a xanthate of the formula

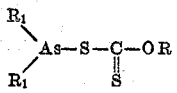

in which R is selected from the group consisting of saturated and unsaturated linear and branched alkyl hydrocarbon, and cycloparaffin hydrocarbon radicals, and $R_1$ is a hydrocarbon radical taken from the group consisting of alkyl and phenyl.

2. A parasiticidal compound of the formula

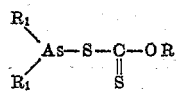

in which R is selected from the group consisting of saturated and unsaturated linear and branched alkyl hydrocarbon, and cycloparaffin hydrocarbon radicals, and $R_1$ is a hydrocarbon radical taken from the group consisting of alkyl and phenyl.

3. In the art of control of insect and fungus pests, the improvement comprising applying dimethylarsenic isopropylxanthate to the locality of said pests.

4. In the art of control of insect and fungus pests, the improvement comprising applying diphenylarsenic ethylxanthate to the locality of said pests.

5. In the art of control of insect and fungus pests, the improvement comprising applying diphenylarsenic isopropylxanthate to the locality of said pests.

6. In the art of control of insect and fungus pests, the improvement comprising applying dimethylarsenic amylxanthate to the locality of said pests.

7. In the art of control of insect and fungus pests, the improvement comprising applying dimethylarsenic allylxanthate to the locality of said pests.

References Cited in the file of this patent

UNITED STATES PATENTS

| 1,766,819 | Hartmann et al. | June 24, 1930 |
| 1,909,498 | Oechslin | May 16, 1933 |
| 2,368,670 | Lincoln et al. | Feb. 6, 1945 |
| 2,644,005 | Urbschat | June 30, 1953 |

OTHER REFERENCES

Malatesta: Gazzetta Chimica Italiana, vol. 69 (1939), pp. 633–634.